(12) United States Patent
Lee et al.

(10) Patent No.: US 7,313,254 B2
(45) Date of Patent: Dec. 25, 2007

(54) METHOD FOR EXTRACTING OBJECT REGION

(75) Inventors: Jin Soo Lee, Seoul (KR); Jae Shin Yu, Seoul (KR)

(73) Assignee: LG Electronics Inc., Seoul (KR)

( * ) Notice: Subject to any disclaimer, the term of this patent is extended or adjusted under 35 U.S.C. 154(b) by 696 days.

(21) Appl. No.: 10/255,680

(22) Filed: Sep. 27, 2002

(65) Prior Publication Data
US 2003/0063669 A1    Apr. 3, 2003

(30) Foreign Application Priority Data
Sep. 29, 2001 (KR) .................. 2001-60928

(51) Int. Cl.
*G06K 9/00* (2006.01)
(52) U.S. Cl. ..................... 382/103; 382/190
(58) Field of Classification Search ................ 382/100, 382/103, 107, 235, 236, 190, 173; 348/14.1, 348/97, 154, 155, 208.1, 208.2, 208.4, 208.13, 348/208.16, 220.1, 352, 402.1, 407.1, 221.1; 352/39, 137, 240.08
See application file for complete search history.

(56) References Cited
U.S. PATENT DOCUMENTS 5,173,865 A * 12/1992 Koike et al. ............. 702/155
5,937,111 A * 8/1999 Yamada ...................... 382/308
6,335,985 B1 * 1/2002 Sambonsugi et al. ....... 382/190
6,349,113 B1 * 2/2002 Mech et al. ........... 375/240.08
6,580,812 B1 * 6/2003 Harrington ................. 382/107
6,618,507 B1 * 9/2003 Divakaran et al. .......... 382/236
6,636,635 B2 * 10/2003 Matsugu ..................... 382/218
6,970,600 B2 * 11/2005 Abe .......................... 382/187

FOREIGN PATENT DOCUMENTS
JP    2000082145    3/2000

OTHER PUBLICATIONS
Neri, et al., "Automatic moving object and background separation," Signal Processing, vol. 66, (1998) pp. 219-232.

* cited by examiner

*Primary Examiner*—Samir Ahmed
*Assistant Examiner*—Abolfazl Tabatabai
(74) *Attorney, Agent, or Firm*—Birch, stewart, Kolasch & Birch, LLP

(57) ABSTRACT

The present invention discloses a method for extracting an object region in a motion picture, which can extract the object region of a current frame using different methods based on a degree of motion of the object. Especially, when the object has many motions, an object region of a previous frame is modified by comparing a CDI (Change Detected Image) generated based on a difference between the previous frame and the current frame with the previous frame. As a result, the present invention can be applied to image communication requiring real-time processing, and also applied to techniques requiring precise background change by dividing the object region in pixel units.

27 Claims, 10 Drawing Sheets

METHOD FOR EXTRACTING OBJECT REGION

BACKGROUND OF THE INVENTION

1. Field of the Invention

The present invention relates to a method for extracting an object region in a motion picture, which can rapidly extract the object region by using a degree of a motion of an object.

2. Background of the Related Art

These days, a technique of tracking an object in a motion picture has been generally applied in a field of image search of a monitoring camera, and in an object-based coding field such as compression of image communication or MPEG-4.

In the monitoring camera environment, if an instantaneous motion is captured in a situation that no moving object exists, an object is considered to be appeared, and then an object region is extracted and tracked in a motion-generated region. Since the background is usually fixed and motion is rarely found in the monitoring camera environment, the object can be relatively easily tracked using motion information.

Recently, an object-based coding method has been focused to perform image communication with a small amount of data, or change of the background. A standard coding method for these purposes is MPEG-4. In addition, a lot of attempts have been made to embody efficient data networking by coding an object region and a background region based on different methods.

As described above, in the image communication environment, while an image is being displayed, most of moving objects appear on a screen. And a ratio of the moving object to the screen size is greater than a ratio of the moving object to the monitoring camera. Thus, in the image communication environment, it is difficult to extract or track the object region by using the motion information.

Accordingly, a variety of methods for extracting or tracking the object region have been suggested.

As one of them, there is a method to initiate an object region by using motion information and edge information, and extract the object region as follows. Firstly, the object region of a previous frame is shifted in a predetermined direction, and overlapped with edges of a current frame. A direction of the largest overlap region is deemed as a moving direction, and the overlapped edges are presumed to be part of edges of a new object region. Thereafter, a difference between the previous frame and the current frame is obtained, and an edge region of the current frame in the difference-generated region is also presumed to be part of edges of the object region. The edge regions obtained through the two methods are ORed, to obtain the object region of the current frame.

However, the aforementioned method fails to obtain a precise edge in a background image having complicated edges.

There is another method to compose an object region by dividing a given image into regions by colors and merging them again. Here, sub regions are divided according to a Watershed method, and the regions of similar motion information and color information can be merged on the basis of similarity in motions and colors. In addition, the regions can be merged by merely using the color information. However, such an image division/merging based algorithm generally requires a long processing time, and thus is hard to be applied to a real time object tracking algorithm. In the case that a user wears clothes of complicated patterns, the regions are difficult to merge by colors.

As still another method, there is also provided a method to extract an initial object region with the help of the user, and track how the extracted region is moved by time. However, it also takes an extended period of time, and thus fails to apply itself in a real time processing.

A general method for extracting an object region from a motion picture will now be explained in more detail. FIG. 1 is a concept view illustrating the method for extracting the object region from the motion picture. Referring to FIG. 1, the method for extracting the object region includes a step for extracting an initial object region (step 111) and a step for tracking the extracted object region (step 121). Here, step 111 extracts the object region from a previous frame by using an automatic or semi-automatic algorithm, without any information on the object region.

Step 121 tracks the object region of a current frame on the basis of the object region extracted from the previous frame. It uses a faster algorithm than the initial object region extraction.

On the other hand, an object region re-modeling step (step 141) may be used in addition to the two essential steps, namely steps 111 and 121. When the object region is tracked for a long time, errors generated during the tracking process can be accumulated and increased. In order to prevent increase of the errors, the re-modeling process must be performed periodically or each time when a specific condition is met. For this, an additional step (step 131) for providing a periodical value or specific condition and judging it can be added.

A step (step 151) for refining the object region can be further included. Step 151 refines and modifies an imprecise boundary of the object region extracted according to the motion of the object.

The above-described methods are used for motion pictures obtained under an artificially well-formed lighting, such as news data.

However, these methods are not useful for a real environment such as the image communication due to the following reasons. That is, problems may occur because of noise of lighting itself or property of image obtaining device.

The image communication is mostly executed indoors, and a fluorescent light is generally used as an interior illumination. As publicly known, the fluorescent light is serious in flickering. Even though such flickering is not sensed by human eyes, when a photographed data is analyzed, a difference is generated between two temporally different frames even in a non-motion region due to the illumination property of the fluorescent light. The difference gets more serious in an edge region. In addition, a PC camera has lower image quality than a camcorder. Thus, noise may be generated in the whole images, especially, the lighting may be changed by motion of the user.

On the other hand, the more the object moves, the bigger difference the two frames have in a corresponding position, and the less the object moves, the smaller difference the two frames have. The two frames have a difference even in a non-motion position. The difference may be bigger than the difference generated in a boundary of the small motion object, and smaller than the difference generated in a boundary of the many motion objects.

Accordingly, when it is presumed that the difference is generated when the difference is big to remove noise due to technical problems, the small motion may be missed. When the small motion is intended to be found, noise of the background image is also detected. As a result, there are strong demands for extracting the object region of the current frame by distinguishing the motion of the object.

SUMMARY OF THE INVENTION

An object of the invention is to solve at least the above problems and/or disadvantages and to provide at least the advantages described hereinafter.

Accordingly, one object of the present invention is to solve the foregoing problems by providing a method for extracting an object region in a motion picture, which can extract the object region of a current frame by distinguishing a degree of a motion of the object.

It is another object of the present invention to provide a method for extracting an object region which can extract the object region of a current frame by using a change detected image (CDI), when the object has many motions.

It is further another object of the invention to provide a method for extracting an object region which can re-model the object region of a current frame according to an object extraction method of the invention, when the object has many motions to increase errors.

These and other objects and advantages of the invention are achieved by providing a method for extracting an object region in a motion picture, which extracts the object region of a current frame using different methods based on a degree of motion of an object.

The degree of motion of the object represents displacement of the object between the previous frame and the current frame.

When the object has few motions, the object region of the previous frame can be replaced with the object region of the current frame.

When the object has many motions, the object region of the current frame can be extracted by using a CDI generated based on a difference between the current frame and the previous frame.

According to another aspect of the invention, a method for extracting an object region in a motion picture includes the steps of: generating a CDI (Change Detected Image) according to a difference between two temporally different frames; comparing an object region of the CDI with an object region of the previous frame; and modifying the object region of the previous frame according to the comparison result.

In accordance with the method for extracting the object image, the step for modifying the object region of the previous image includes the steps of: scanning the CDI and the previous frame internally from the four directional edges; sensing a contour which firstly appears in the scanning direction between a contour of the object region of the CDI and a contour of the object region of the previous frame; and shrinking or expanding the object region of the previous frame until it can meet the contour of the object region of the CDI, when the contour of the object region of the previous frame is sensed first.

The step for modifying the object region of the previous frame further includes a step for shrinking or expanding the object region of the previous frame until it can meet the contour of the object region of the previous frame, when the contour of the object region of the CDI is sensed first.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description will present a method for extracting an object region according to a preferred embodiment of the invention in reference to the accompanying drawings.

In accordance with the present invention, an object region of a current frame is extracted using different methods based on a degree of motion of an object. Here, the degree of the motion of the object represents displacement of the object between the previous frame and the current frame. Especially, when the object has many motions, the object region of the previous frame is modified by using a change detected image (CDI) generated based on a difference between the previous frame and the current frame, thereby extracting the object region of the current frame. A difference generated due to noise can be ignored if extracting the current object region by using the CDI, thus precise object region can be extracted.

Figure 1:
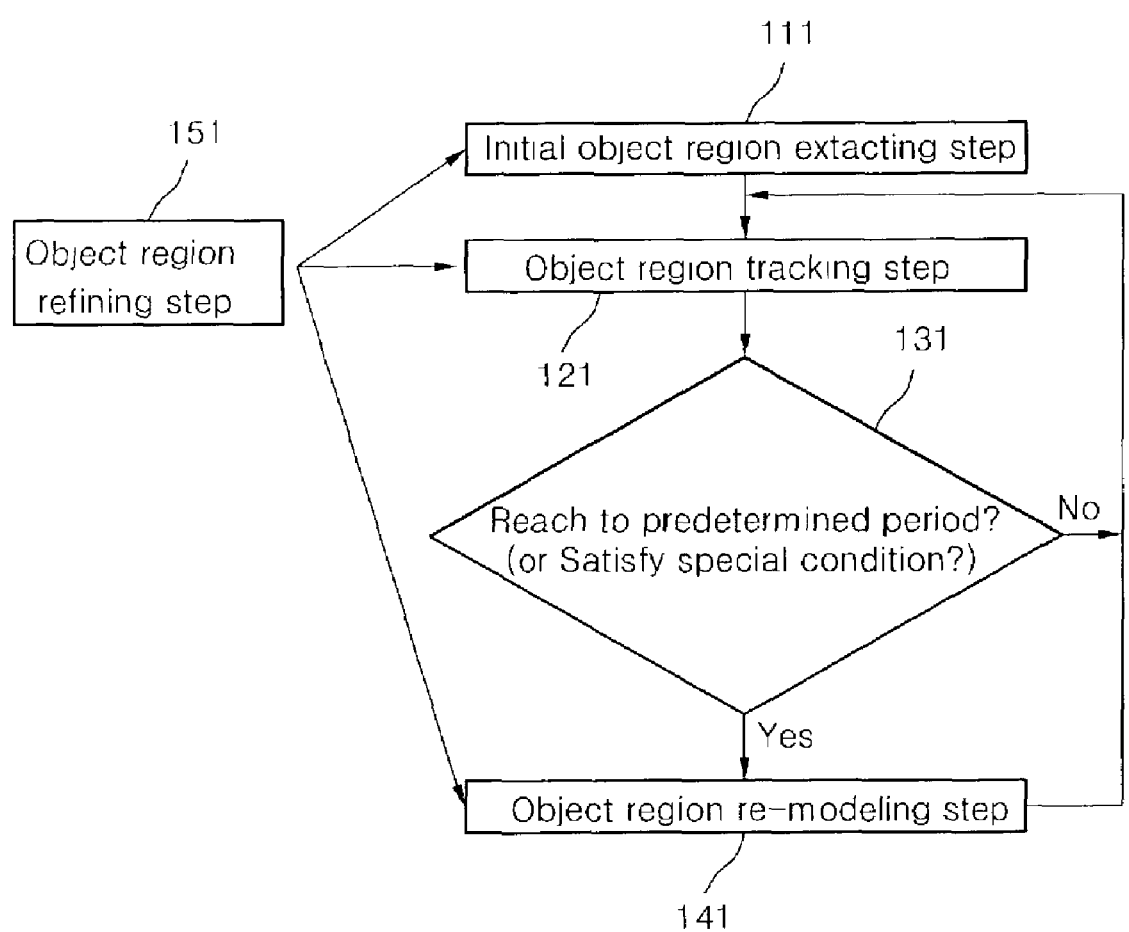
FIG. 1 is a concept view illustrating a general method for extracting an object region from a motion picture.
Figure 2:
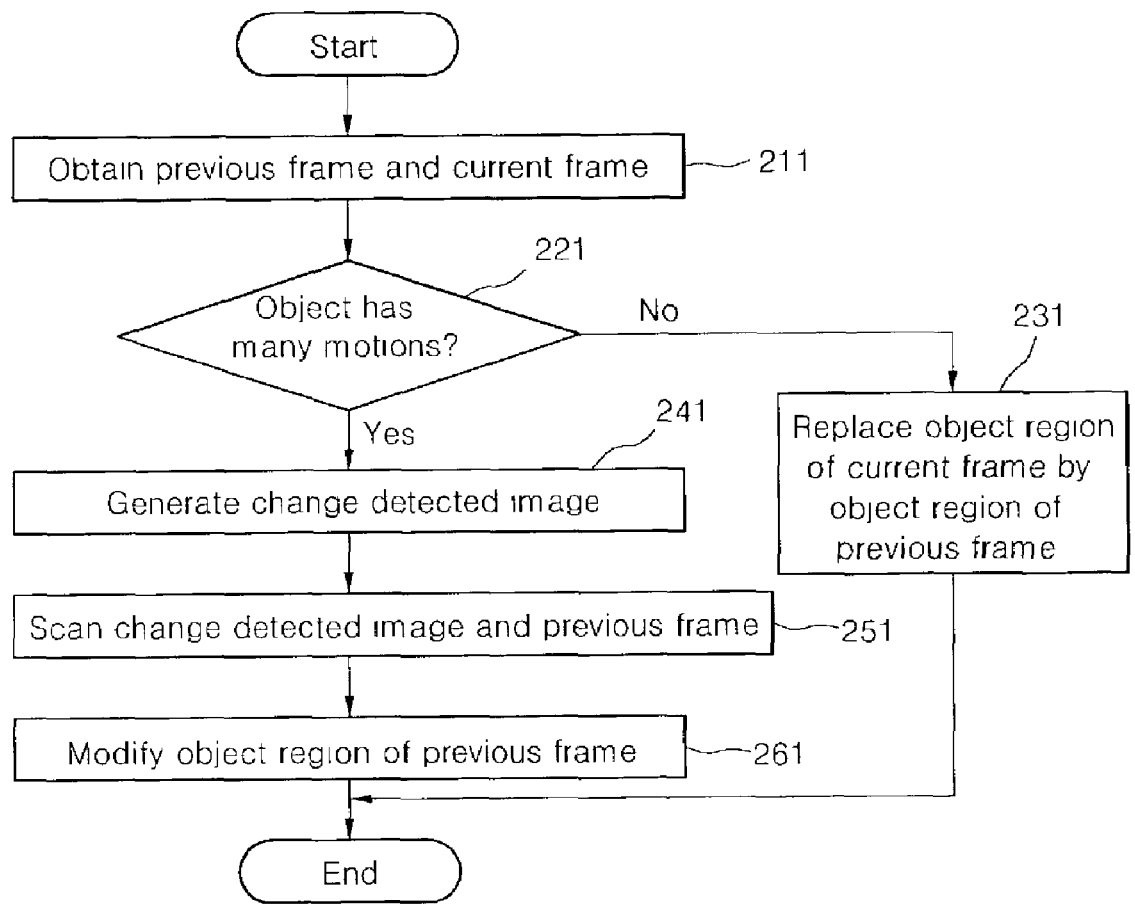
FIG. 2 is a flowchart showing a process for extracting an object region in accordance with the present invention.
Figure 3:
FIG. 3 is an exemplary view illustrating an original image obtained from a current frame in accordance with the present invention.

FIG. 2 is a flowchart showing a process for extracting the object region in accordance with the present invention. As illustrated in FIG. 2, the previous frame and the current frame are obtained from a motion picture (step 211).

Here, the motion is judged on the basis of the previous frame and the current frame (step 221). That is, whether the object has many or few motions is confirmed. It can be judged by using a difference of pixel values between the previous frame and the current frame. When the difference of the pixel values is small, the object has few motions, and when the difference of the pixel values is big, the object has many motions.

As the judgment result, when the object has few motions, the object region of the previous frame replaces the object region of the current frame, thereby extracting the object region of the current frame (step 231).

Figure 4:
FIG. 4 is an exemplary view illustrating a previous model obtained from a previous frame in accordance with the present invention.

On the other hand, when the object has many motions, pixels having a pixel value difference over a predetermined critical value are set to generate a CDI (step 241). Here, 'setting' implies to modify the corresponding pixel from an off to on state. Thus, the on-state pixel is deemed to have many motions. At this time, a previous model and an original image are generated respectively from the previous frame and the current frame. The original image is shown in FIG. 5, the previous model is shown in FIG. 4, and the CDI is shown in FIG. 5.

Figure 5:
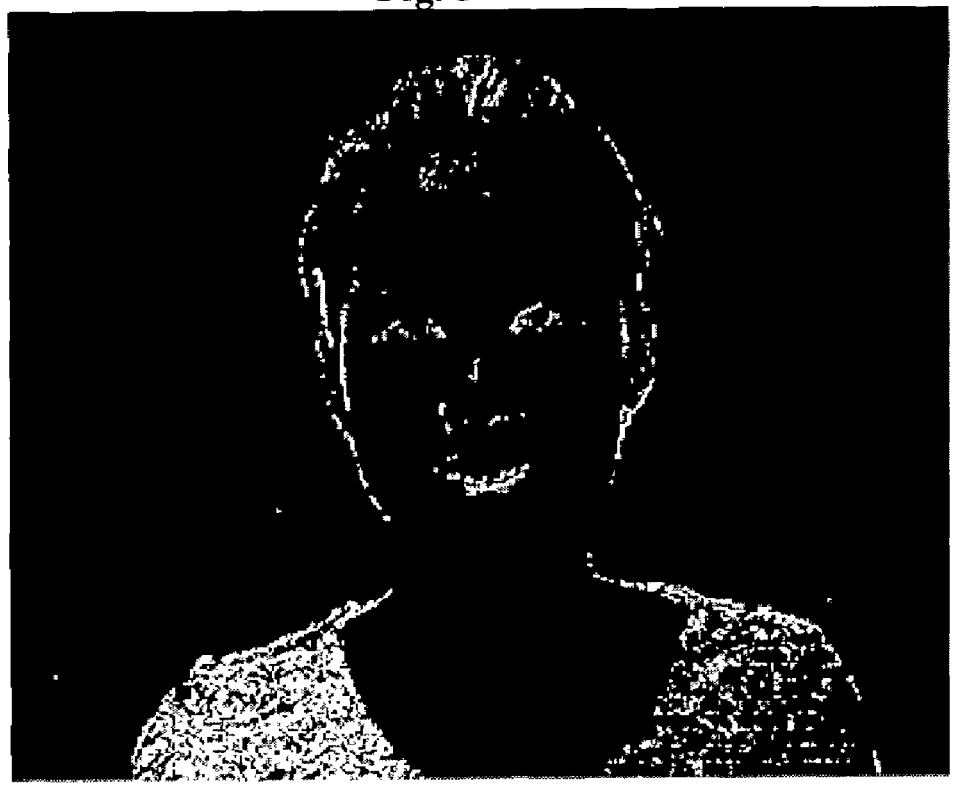
FIG. 5 is an exemplary view illustrating a change detected image in accordance with the present invention.

As depicted in FIG. 5, the CDI only shows a difference-generated region between the previous frame and the current frame. That is, the CDI displays a big motion portion of the boundary having edges.

Figure 6:
FIG. 6 is an exemplary view illustrating a closed image in accordance with the present invention.
Figure 7A:
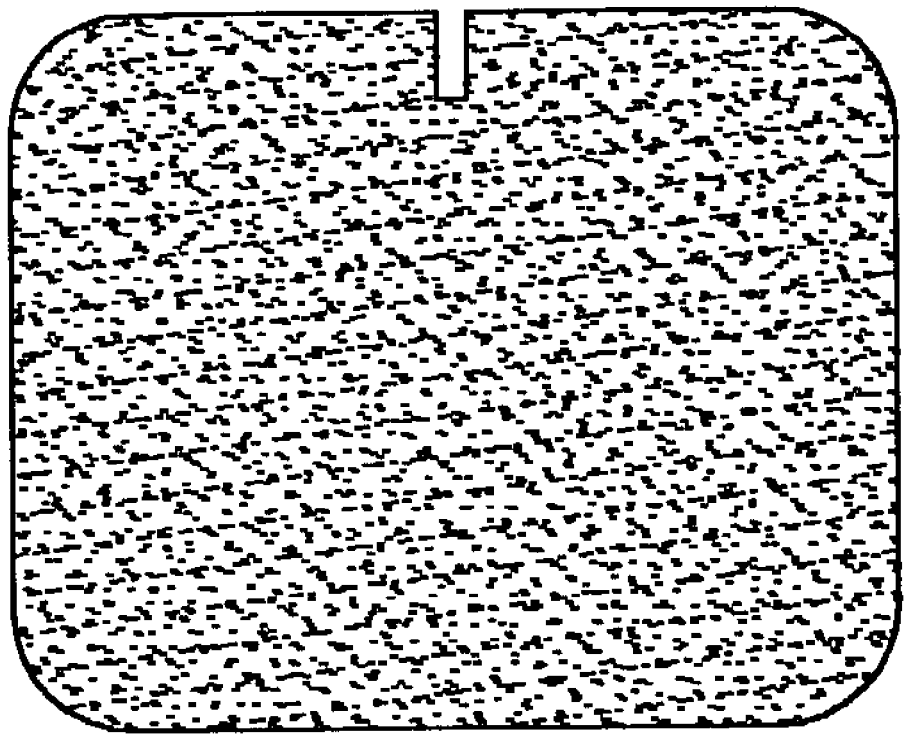
FIG. 7 is a view illustrating a process for extracting the object region by using closing morphology in accordance with the present invention.
Figure 7B:
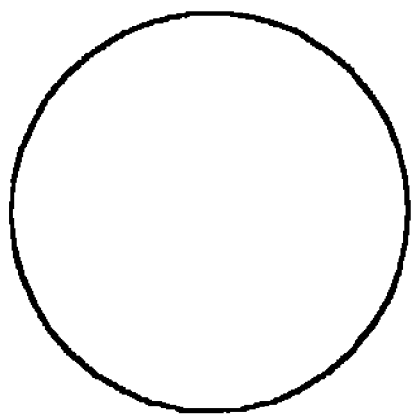
Figure 7C:
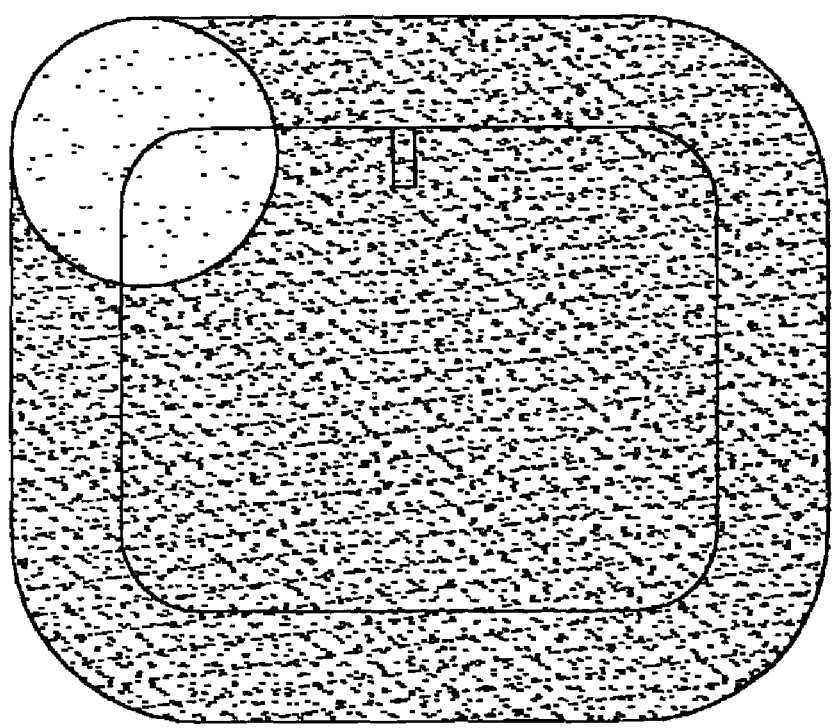
Figure 7D:
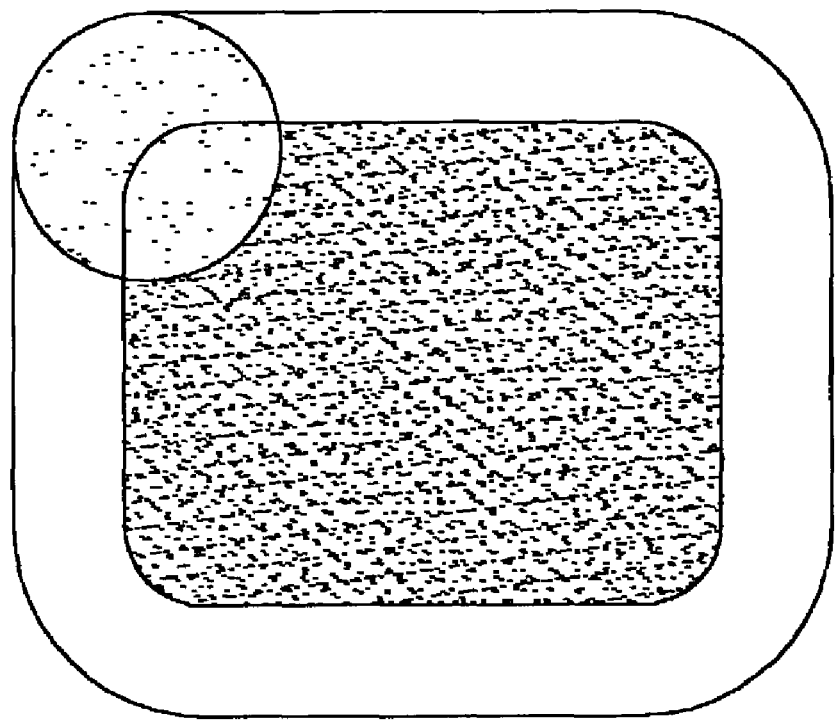

Here, in order to remove small grooves or holes from the CDI, the CDI is simplified by using closing morphology (closed image). FIG. 6 shows the closed image. As shown in FIG. 7, the closing morphology removes small grooves or holes from the object region and connects small separated points by consecutively performing dilation and erosion processes. As illustrated in FIG. 6, the points of the CDI of FIG. 5 are converted into sides through the closing morphology. In accordance with the present invention, a diameter of elements is defined as 15 pixels, but can be varied.

On the other hand, the CDI and the previous frame are scanned internally from the four directional edges (step 251). The CDI can be replaced by the closed image simplified through the closing morphology. Here, the scanning process is performed to compare a contour of the object region of the CDI with a contour of the object region of the previous frame, and to sense whether the set pixels of the CDI are displayed earlier than those of the previous frame. That is, when the object has many motions, a predetermined interval exists between the contour of the object region of the CDI and the contour of the object region of the previous frame. When the scanning process is performed in the scanning direction, at least one of the CDI and the previous frame is sensed earlier than the other. Here, the scanning process is executed in four directions, namely left to right, right to left, up to down and down to up.

The object region of the previous frame is modified according to the sensing result (step 261).

As the scanning result, when unset pixels of the contour of the object region of the previous frame appear earlier than those of the contour of the object region of the CDI in the scanning direction, the pixels which exist between the contour of the object region of the previous frame and the contour of the object region of the CDI and which are included in the object region of the previous frame are set. That is, the object region of the previous frame is expanded as large as the object region of the CDI.

Conversely, when set pixels of the contour of the object region of the previous frame appear earlier than those of the contour of the object region of the CDI in the scanning direction, the pixels which exist between the contour of the object region of the previous frame and the contour of the object region of the CDI and which are included in the object region of the previous frame are unset. That is, the object region of the previous frame is shrunken as large as the object region of the CDI.

Figure 9:
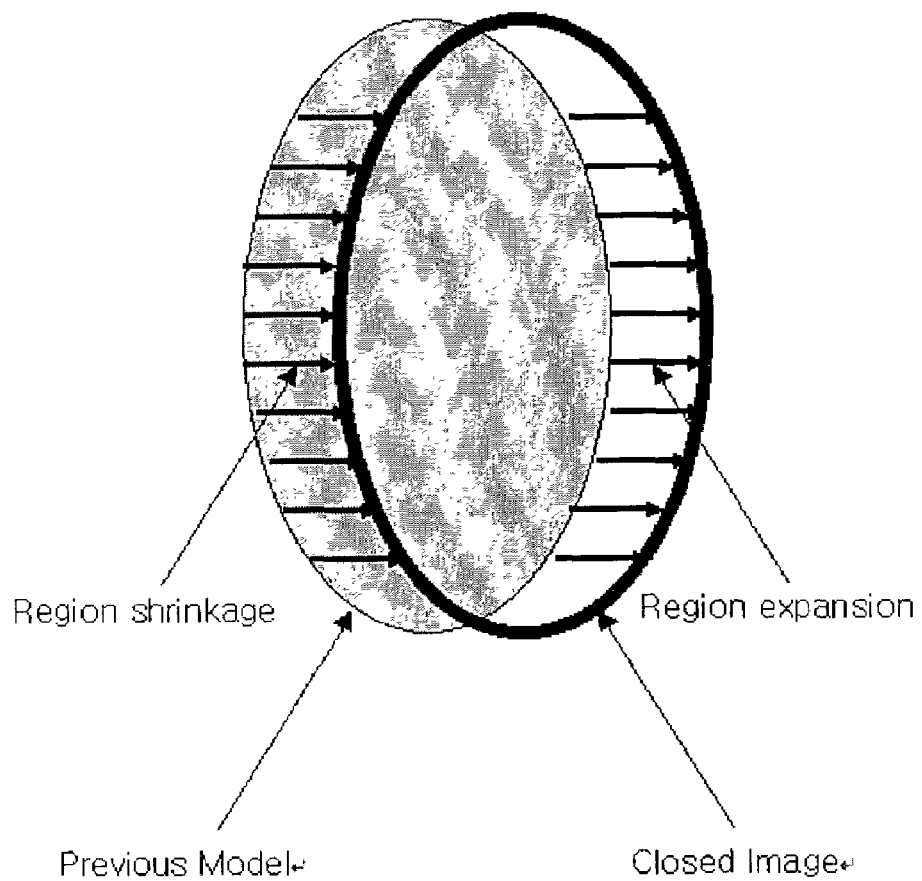
FIG. 9 is a concept view illustrating regional shrinkage and expansion between the previous model and the closed model in accordance with the present invention.
Figure 10A:
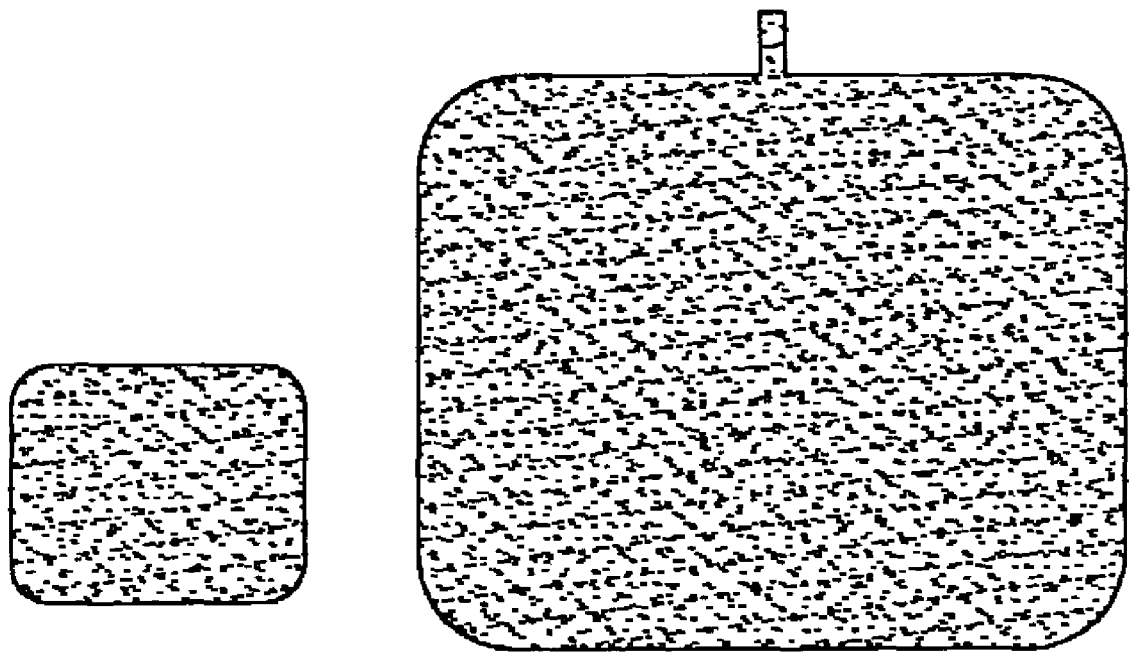
FIG. 10 is a view illustrating a process for extracting the object region by using opening morphology in accordance with the present invention.
Figure 10B:
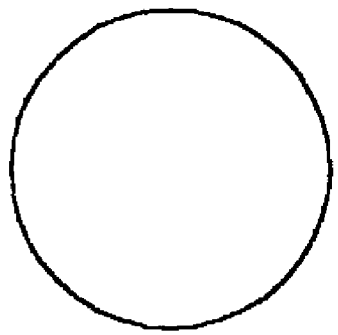
Figure 10C:
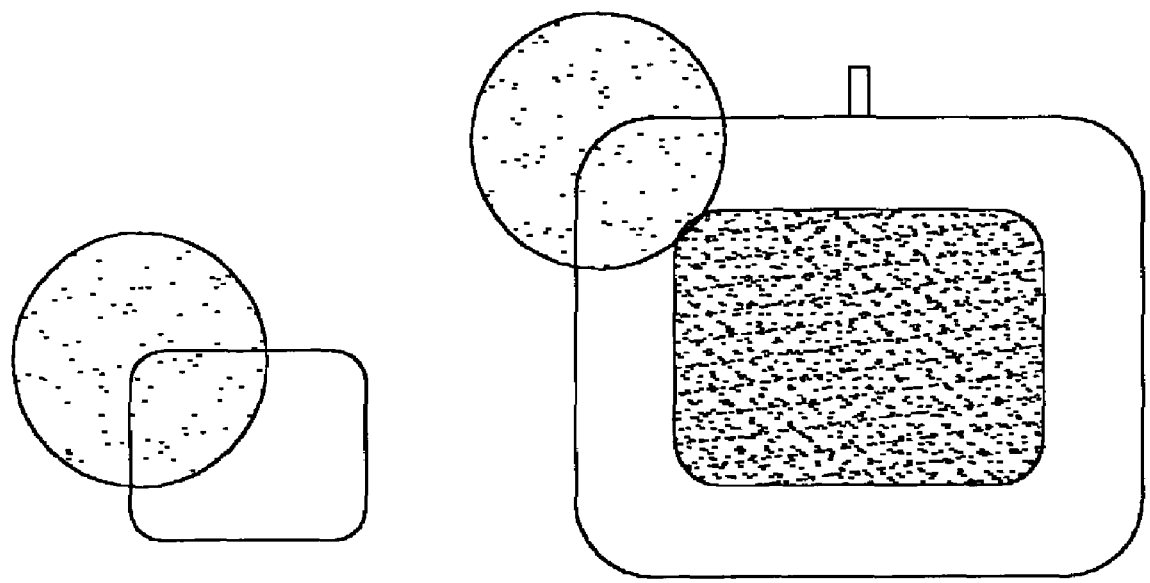
Figure 10D:
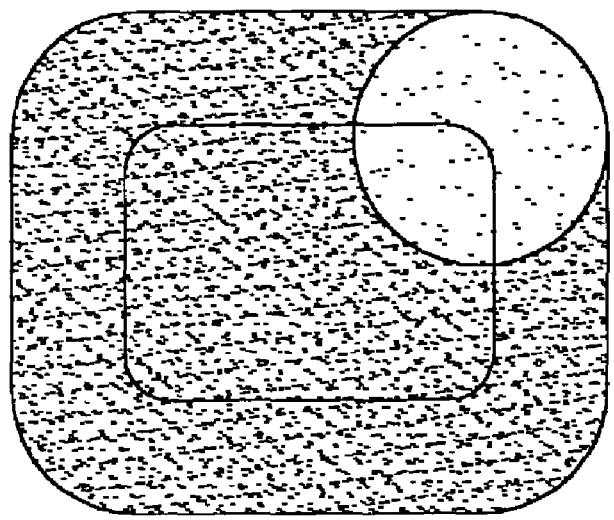

The process for shrinking or expanding the object region of the previous frame is shown in FIG. 9. The shrinkage or expansion of the object region of the previous frame can be applied in the same manner when the contour of the object region of the CDI appears earlier.

That is, as the sensing result of step 251, when the contour of the object region of the CDI appears earlier than the contour of the object region of the previous frame, if the pixels which exist between the two contours and which are included in the object region of the previous frame are set, the pixels included in the object region of the previous frame can be unset to meet the contour of the object region of the previous frame.

In addition, in order to shrink the object region of the previous frame, when the pixels which exist between the two contours and which are included in the object region of the previous frame are unset, the pixels included in the object region of the previous frame can be set to meet the contour of the object region of the previous frame. Here, the former represents shrinkage of the object region, and the latter represents expansion of the object region.

In the method for shining or expanding the object region of the previous frame, the scanning direction moves from left to right, but can move from right to left, up to down or down to up. Moreover, when the screen is changed through zoom-in or zoom-out, the shrinking or expanding process can be performed in all directions.

Figure 8:
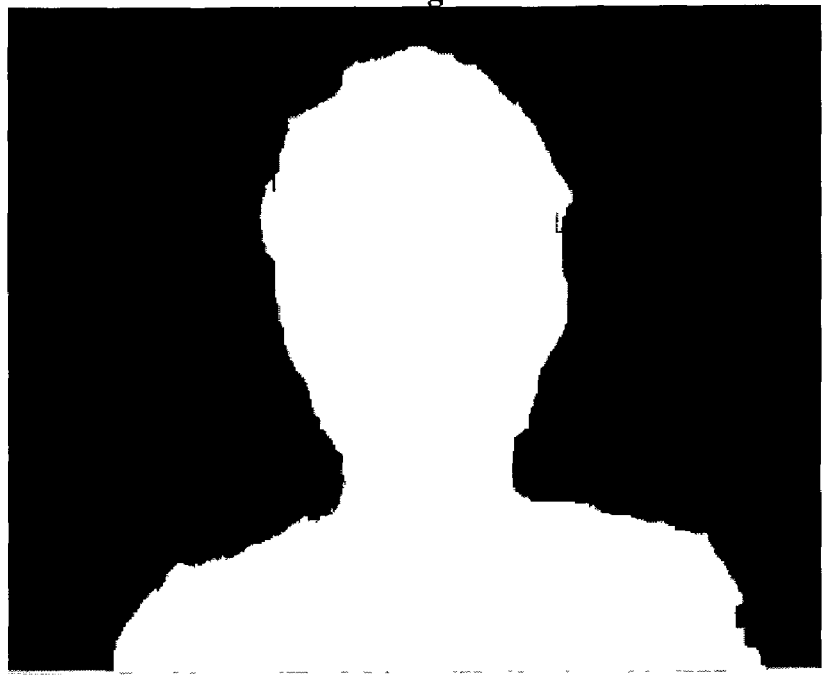
FIG. 8 is an exemplary view illustrating a refined model in accordance with the present invention.

The refined image obtained in step 261 is shown in FIG. 8.

Figure 11:
FIG. 11 is an exemplary view illustrating a simplified model in accordance with the present invention.

The refined image is simplified by removing small lines according to opening morphology(FIG. 10). The thusly-obtained simplified image is shown in FIG. 11.

Figure 12:
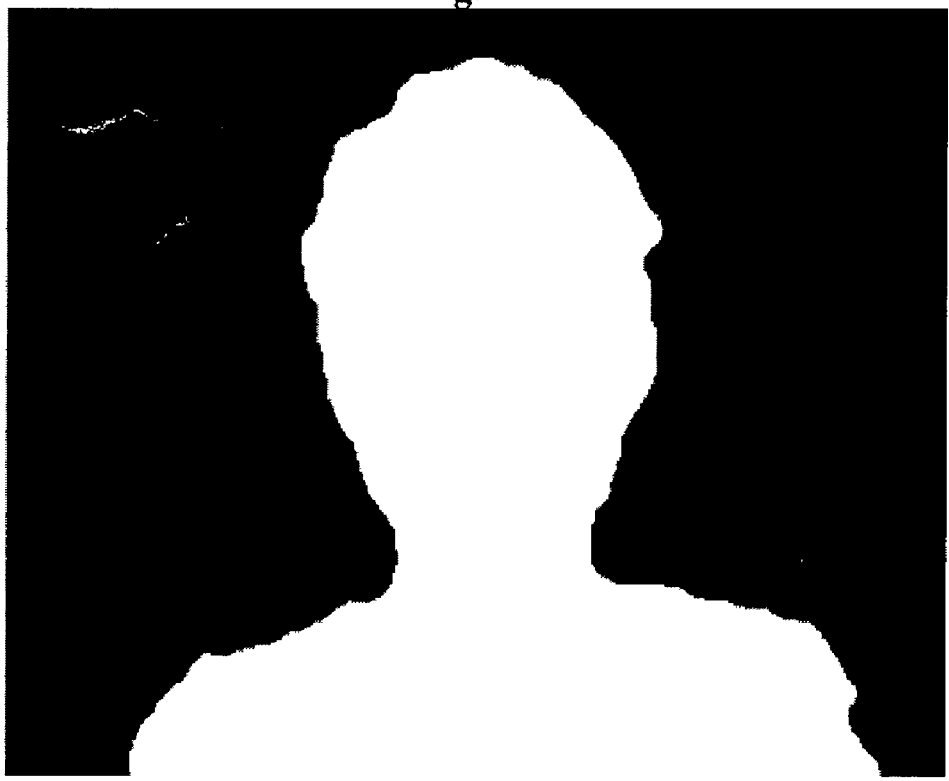
FIG. 12 is an exemplary view illustrating a reshaped model in accordance with the present invention.

In addition, the simplified image is re-simplified by removing small holes according to the closing morphology. The thusly-obtained reshaped image is shown in FIG. 12. Therefore, the reshaped image becomes the object region of the current frame. In case the opening morphology and the closing morphology are omitted, the refined image obtained in step 261 can be the object region of the current frame.

On the other hand, the object region tracking algorithm generally uses a method for tracking the object region of the current frame by using the object region of the previous frame. In this case, errors slightly generated during the tracking process are accumulated by time. An error increase speed is very high in a real image displaying about 15 frames per second. Accordingly, it is necessary to newly extract the precise object region periodically or in a special condition.

However, when the object region is periodically re-modeled, if the error increase speed is high, the period must be shortened. Since the information on the error increase cannot be obtained, the object region is difficult to re-model. In addition, the re-modeling algorithm is similar to the initial object region extracting algorithm, and thus requires a longer time than the tracking algorithm.

When the object has few motions, the error increase weakens. It is thus possible to ignore the re-modeling process. When the object has many motions, the re-modeling process is carried out. That is, when many motions exist, the information on the object region is sufficient. Therefore, the re-modeling process can be easily performed by using the information on the object region.

In accordance with the present invention, when many motions exist, the object region is extracted by using the difference between the two frames. The information on the object region is relatively accurate at the existence of many motions.

According to the object region extracting algorithm of the invention, the object region is re-modeled at the existence of many motions by using the motion information of the current frame, instead of using the information on the object region of the previous frame. It is because most of the regional boundaries are clear in the CDI in a number of motions as shown in FIG. 6.

Conversely, the regional boundaries are not clear at the existence of the few motions, and thus the boundary of the previous model is used as it is. In this case, the tracking algorithm is identical to the re-modeling algorithm, and thus temporal problems do not occur.

As discussed earlier, in accordance with the present invention, the method for extracting the object region can be efficiently used for object-based coding of the motion picture as in the image communication, and processed in a real time.

In addition, the method for extracting the object region performs pixel unit regional division, and thus is suitable for applications requiring precise division techniques such as background switching.

Furthermore, the method for extracting the object region individually provides the algorithm for extracting the initial object region and the algorithm for tracking the object region of the current frame from the object region of the previous frame, thereby efficiently using the algorithms.

Moreover, when the object has many motions, the method for extracting the object region re-models the object region into the more precise region by automatically using a lot of motion information, to extract the object region according to the optimized method in different states.

While the invention has been shown and described with reference to a certain preferred embodiment thereof, it will be understood by those skilled in the art that various changes in form and details may be made therein without departing from the spirit and scope of the invention as defined by the appended claims.

The foregoing embodiment and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method for extracting an object region in a motion picture, the method comprising:
   extracts the object region of a current frame based on a degree of a motion of an object representing a displacement of each of pixels between a previous frame and the current frame, wherein the extracting step includes
      when the displacement of the pixels between the previous frame and the current frame is higher than a predetermined value, generating a CDI (Change Detected Image) designating the pixels in the current frame having the displacement higher than the predetermined value to be an on state and designating the other pixels to be an off state.

2. The method according to claim 1, further comprising when the displacement of the pixels between the previous frame and the current frame is lower than the predetermined value, replacing the pixels of the previous frame with the pixels of the current frame.

3. The method according to claim 1, wherein the object region of the current frame is extracted is the on state pixels of the current frame in the CDI.

4. The method according to claim 3, wherein the CDI is simplified according to a closing morphology.

5. The method according to claim 3, wherein the object region of the previous frame is shrunken or expanded by comparing a contour of the object region of the CDI with a contour of the object region of the previous frame.

6. The method according to claim 5, wherein the shrunken or expanded object region of the previous frame is simplified according to an opening morphology, and then re-simplified according to a closing morphology.

7. The method according to claim 5, wherein the comparison is performed by scanning the CDI and the previous frame internally from four directional edges.

8. The method according to claim 5, wherein, the shrinkage of the object region of the previous frame is a step to unset the pixels which exist between the contour of the object region of the previous frame and the contour of the object region of the CDI and which are included in the object region of the previous frame, when set pixels of the contour of the object region of the previous frame appear earlier than those of the contour of the object region of the CDI.

9. The method according to claim 5, wherein, the expansion of the object region of the previous frame is a step to set the pixels which exist between the contour of the object region of the previous frame and the contour of the object region of the CDI and which are included in the object region of the previous frame, when unset pixels of the contour of the object region of the previous frame appear earlier than those of the contour of the object region of the CDI.

10. The method according to claim 1, further comprising:
    comparing an object region of the CDI with an object region of the previous frame; and
    modifying the object region of the previous frame according to a comparison result of the object region of the CDI with the object region of the previous frame.

11. The method according to claim 10, wherein the step for modifying the object region of the previous image comprises:
    scanning the CDI and the previous frame internally from the four directional edges;
    sensing a contour which firstly appears in the scanning direction between a contour of the object region of the CDI and a contour of the object region of the previous frame; and
    shrinking or expanding the object region of the previous frame until it can meet the contour of the object region of the CDI, when the contour of the object region of the previous frame is sensed first.

12. The method according to claim 11, wherein, the shrinkage of the object region of the previous frame is a step to unset the pixels included in the object region of the previous frame to meet the contour of the object region of the CDI, when the pixels which exist between the two contours and which are included in the object region of the previous frame are set.

13. The method according to claim 11, wherein, the expansion of the object region of the previous frame is a step to set the pixels included in the object region of the previous frame to meet the contour of the object region of the CDI, when the pixels which exist between the two contours and which are included in the object region of the previous frame are unset.

14. The method according to claim 11, further comprising a step of:
    shrinking or expanding the object region of the previous frame to meet the contour of the object region of the previous frame, when the contour of the object region of the CDI is sensed earlier in the sensing step.

15. The method according to claim 14, wherein, the shrinkage of the object region of the previous frame is a step to unset the pixels included in the object region of the previous frame to meet the contour of the object region of the previous frame, when the pixels which exist between the two contours and which are included in the object region of the previous frame are set.

16. The method according to claim 14, wherein, the expansion of the object region of the previous frame is a step to set the pixels included in the object region of the previous frame to meet the contour of the object region of the previous frame, when the pixels which exist between the two contours and which are included in the object region of the previous frame are unset.

17. A method for extracting an object region in a motion picture, comprising:
    judging a degree of a motion of an object between a previous frame and a current frame;
    generating a CDI (Change Detected Image) according to a judgement result of the degree of the motion of the object;
    comparing an object region of the CDI with an object region of the previous frame; and
    modifying the object region of the previous frame according to the comparison result.

18. The method according to claim 17, further comprising:
    simplifying the CDI according to a closing morphology prior to the comparison.

19. The method according to claim 17, further comprising:
    simplifying the modified object region of the previous frame according to an opening morphology; and
    simplifying the object region simplified according to the opening morphology by using a closing morphology.

20. The method according to claim 17, wherein the comparison is performed on the basis of position variations of a contour of the object region of the CDI and a contour of the object region of the previous frame.

21. The method according to claim 17, wherein the step for modifying the object region of the previous image comprises the steps of:
    scanning the CDI and the previous frame internally from the four directional edges;
    sensing a contour which firstly appears in the scanning direction between a contour of the object region of the CDI and a contour of the object region of the previous frame; and
    shrinking or expanding the object region of the previous frame until it can meet the contour of the object region of the CDI, when the contour of the object region of the previous frame is sensed first.

22. The method according to claim 21, wherein, the shrinkage of the object region of the previous frame is a step to unset the pixels included in the object region of the previous frame to meet the contour of the object region of the CDI, when the pixels which exist between the two contours and which are included in the object region of the previous frame are set.

23. The method according to claim 21, wherein, the expansion of the object region of the previous frame is a step to set the pixels included in the object region of the previous frame to meet the contour of the object region of the CDI, when the pixels which exist between the two contours and which are included in the object region of the previous frame are unset.

24. The method according to claim 21, further comprising a step of:
    shrinking or expanding the object region of the previous frame to meet the contour of the object region of the previous frame, when the contour of the object region of the CDI is sensed earlier in the sensing step.

25. The method according to claim 24, wherein, the shrinkage of the object region of the previous frame is a step to unset the pixels included in the object region of the previous frame to meet the contour of the object region of the previous frame, when the pixels which exist between the two contours and which are included in the object region of the previous frame are set.

26. The method according to claim 24, wherein, the expansion of the object region of the previous frame is a step to set the pixels included in the object region of the previous frame to meet the contour of the object region of the previous frame, when the pixels which exist between the two contours and which are included in the object region of the previous frame are unset.

27. The method according to claim 17, wherein the step of generating the CDI includes when a degree of a motion of pixels between the previous frame and the current frame is higher than a predetermined value, generating a CDI (Change Detected Image) designating the pixels in the current frame having the degree of the motion higher than the predetermined value to be an on state and designating the other pixels to be an off state.

* * * * *